US00RE37575E

(19) United States
(12) Reissued Patent
Lambert

(10) Patent Number: US RE37,575 E
(45) Date of Reissued Patent: Mar. 12, 2002

(54) EDGE PROTECTING PACKAGING AND DISTRIBUTION SYSTEM FOR ROLLED LAMINAR STOCK

(75) Inventor: William E. Lambert, Doswell, VA (US)

(73) Assignee: International Paper Company, Tuxedo, NY (US)

(21) Appl. No.: 08/866,148

(22) Filed: May 30, 1997

Related U.S. Patent Documents

Reissue of:
(64) Patent No.: 5,515,977
Issued: May 14, 1996
Appl. No.: 08/513,425
Filed: Aug. 10, 1995

(51) Int. Cl.[7] ..... B65D 85/66
(52) U.S. Cl. ..... 206/597; 206/395; 206/397; 206/408
(58) Field of Search ..... 206/303, 304.1, 206/304.2, 386, 389, 391, 394, 395, 397, 408, 410, 413, 597, 599; 108/53.5, 55.3

(56) References Cited

U.S. PATENT DOCUMENTS

| | | | | | |
|---|---|---|---|---|---|
| 354,010 | A | | 12/1886 | Black | |
| 769,926 | A | | 9/1904 | Williams | |
| 1,060,529 | A | | 4/1913 | Bodette | |
| 1,222,193 | A | | 4/1917 | Dutcher | |
| 2,127,044 | A | * | 8/1938 | Mutchler, Sr. | 410/49 |
| 2,445,152 | A | | 7/1948 | Poole | |
| 2,698,696 | A | | 1/1955 | Strong | |
| 2,810,354 | A | | 10/1957 | Zikmund et al. | |
| 2,945,454 | A | | 7/1960 | Beck | |
| 2,951,669 | A | | 9/1960 | Davidson | |
| 2,954,197 | A | | 9/1960 | Laird | |
| 3,004,742 | A | * | 10/1961 | Davidson | 108/51.3 |
| 3,091,348 | A | | 5/1963 | Neuhauser | |
| 3,197,236 | A | * | 7/1965 | Burton | 410/49 |
| 3,299,989 | A | * | 1/1967 | Santosuosso | 410/42 |
| 3,315,800 | A | | 4/1967 | Wagner | |
| 3,430,586 | A | | 3/1969 | Oswald | |
| 3,472,363 | A | * | 10/1969 | Rustin, Jr. et al. | 206/597 |
| 3,507,415 | A | | 4/1970 | Mankey | |
| 3,753,407 | A | * | 8/1973 | Tilseth | 108/55.3 |
| 3,829,148 | A | | 8/1974 | Stoneburner | |
| 3,858,723 | A | | 1/1975 | Weiss | |
| 3,922,004 | A | | 11/1975 | Chamberlain | |
| 3,938,671 | A | | 2/1976 | Lewey et al. | |
| 4,102,274 | A | | 7/1978 | Feary et al. | |
| 4,126,211 | A | | 11/1978 | Blosser | |

(List continued on next page.)

FOREIGN PATENT DOCUMENTS

| | | | | |
|---|---|---|---|---|
| AU | 25284 | * | 4/1963 | |
| DE | 1 054 950 | | 4/1959 | |
| DE | 2 216 053 | | 7/1973 | |
| DE | 2216053 | * | 7/1973 | |
| DE | 19 37 205 B2 | | 4/1979 | |
| DE | 3408614 | * | 9/1985 | 206/386 |
| DE | 4119363 | * | 2/1993 | |
| EP | 1 262 202 | | 2/1972 | |
| EP | 0 382 587 | | 8/1990 | |
| EP | 0 460 715 A2 | | 12/1991 | |
| EP | 527288 | * | 2/1993 | |
| FR | 2280562 | * | 2/1976 | 206/386 |
| JP | 3-162367 | * | 7/1991 | 206/389 |

*Primary Examiner*—Jim Foster
(74) *Attorney, Agent, or Firm*—Pennie & Edmonds LLP

(57) ABSTRACT

A recyclable protective cradle and a recyclable edge protective packaging and distribution system for preventing rolling and allowing distribution and shipping of rolls of laminar stock rollingly oriented on a pallet. The protective cradle is formed of an interengaging pallet covering and a series of wedge members which act as chocks to prevent the roll from rotating. A wedge removal system allows for the selective removal of one or more wedge members to allow the roll to freely be removed from the protective cradle.

88 Claims, 8 Drawing Sheets

U.S. PATENT DOCUMENTS 4,195,732 A * 4/1980 Bell ..... 206/391
4,315,707 A 2/1982 Fernbach
4,382,733 A * 5/1983 Rodgers ..... 108/55.3
4,572,716 A * 2/1986 West ..... 410/36
4,579,220 A 4/1986 Brundage
4,596,506 A 6/1986 Burgardt et al.
4,653,967 A * 3/1987 Isaksson et al. ..... 410/30
4,732,528 A * 3/1988 Good ..... 206/389
4,796,540 A * 1/1989 Pelfrey ..... 108/55.3
4,805,794 A 2/1989 Tsuchiya et al.
4,871,063 A * 10/1989 Kumbier ..... 206/597
4,997,086 A * 3/1991 Furukawa ..... 206/397
5,029,798 A 7/1991 Clark
5,086,927 A 2/1992 Bach et al.
5,121,839 A 6/1992 Lapp
5,131,903 A 7/1992 Levine et al.
5,170,721 A * 12/1992 Troth et al. ..... 206/386
5,184,743 A * 2/1993 Suzuki et al. ..... 206/389
5,193,700 A * 3/1993 Lyman et al. ..... 206/389
5,336,027 A 8/1994 Paddock
5,340,180 A 8/1994 Chase et al.
5,401,129 A 3/1995 Eatinger
5,413,054 A * 5/1995 Collins ..... 108/55.3
5,425,608 A 6/1995 Reitnouer

* cited by examiner

EDGE PROTECTING PACKAGING AND DISTRIBUTION SYSTEM FOR ROLLED LAMINAR STOCK

Matter enclosed in heavy brackets [ ] appears in the original patent but forms no part of this reissue specification; matter printed in italics indicates the additions made by reissue.

*This is a reissue of application Ser. No. 08/513,425, filed on Aug. 10, 1995, U.S. Pat. No. 5,515,977.*

BACKGROUND OF THE INVENTION

This invention is generally directed to an edge protecting packaging and distribution system for rolled laminar stock and, in particular, to a pallet based corrugated paper packaging and distribution system incorporating a pallet pad and wedge system to package and distribute paper wound on a roll and shipped on pallets oriented so that the paper may be rolled on to and off of the pallets but is held nondestructively and securely in place by the elements of the new system.

In the past, when fine quality papers were shipped for use directly by photocopying and photo-lithographic machinery utilizing uncut, rolled paper, the machinery required the paper to have a margin or border section on at least one and generally both sides of the paper stock for pin feeding. As such, the quality and handling of the edges following shipment of the paper stock in roll form was neither critical nor relevant as the rolls could be and were shipped laying flat on the side of the roll. This had the effect of introducing some minor damage to the edge surface of the roll. Where the paper was wider than the actual finished width of the paper, as required by prior printing equipment, no need to ship the rolls in an upright, rolling orientation, rather than the more stable, laying on its edge orientation, existed.

However, several factors working together have resulted in changes in the way in which rolled paper is utilized in printing operations. First, the requirements of recycling, designed to reduce non-recyclable waste by environmentally conscious users of paper, have caused producers to seek ways to reduce the use of excess paper and, in particular, the excessive use of border sections on both sides of the paper. Next, the printing equipment manufacturers developed machinery which could accurately draw in and cut to size paper without negatively impacting upon performance. Thus, there came the need for paper pre-cut precisely to the finished width dimensions, generally, 11 inches. The effect of this change in paper need was a need for paper to be shipped on the roll to a customer with a nonborder printing machine. Now that the edges of the rolls are a portion of the finished product to be utilized, shipments of the rolls laying flat on their edges are not appropriate both because the edge laying on a wooden pallet can get damaged either through surface contact or merely by virtue of the pressure created by the weight of the roll of paper or any other rolls placed on top of a bottom roll. Likewise, the top edge could be damaged either by another roll on top of it or by contact with handling equipment or other pallets during loading, shipping or unloading.

Accordingly, there is need for an improved packaging and distribution system for protecting the edge of rolls of paper or other laminar stock. In particular, there is a need to maintain the rolls of paper or other laminar stock in an upright orientation in which the planes of the edges of the paper are perpendicular to the plane of the shipping pallet, hereinafter referred to as an "upright" or "rolling" orientation in which the edges and the entire rolls are securely fastened in condition for shipping and use by the paper consumer without damaging the paper stock.

SUMMARY OF THE INVENTION

The invention is generally directed to a protective cradle for a roll of laminar stock rollingly oriented on a pallet. The cradle includes a pallet covering for covering at least a portion of the pallet and supporting and cushioning the roll of laminar stock. It also includes a wedge component, coupled to the pallet covering, with the wedge component contacting the roll of laminar stock proximate a portion of the pallet covering which supports the roll of laminar stock, to prevent the roll of laminar stock from rolling.

The invention is also generally directed to a recyclable protective cradle for a roll of laminar stock which is rollingly oriented on a pallet. A pallet covering covers at least a portion of the pallet, supports and cushions the roll of laminar stock. A wedge member, coupled to the pallet covering contacts the roll of laminar stock proximate a portion of the pallet covering which supports the roll of laminar stock. It prevents the roll of laminar stock from rolling. The pallet covering and wedge member are formed of recyclable material.

The invention is further directed to an edge protective packaging and distribution system for a roll of laminar stock rollingly oriented on a pallet. A cradle, resting on the pallet, supports and prevents rolling of the rolls on the pallet. The cradle includes a pallet covering and wedge members. The pallet covering is placed on the pallet for covering at least a portion of the pallet, supporting and cushioning the roll of laminar stock. The wedge member is coupled to the pallet covering and contacts the roll of laminar stock proximate a portion of the pallet covering which supports the roll of laminar stock, thereby preventing the roll of laminar stock from rolling. One or more straps coupled to the roll and the pallet secure the roll on the cradle to the pallet.

The invention is also directed to an improved edge protecting packaging and distribution system for rolled laminar stock in which the rolled laminar stock is shipped on pallets in an upright orientation.

A further goal of the invention is to provide an improved packaging and distribution system for rolled laminar stock on a pallet incorporating inter-engaging wedge members and pallet pads including wedge engaging sections.

Still another goal of the invention is to provide an improved packaging and distribution system for rolled laminar stock on pallets in which a pallet pad incorporating wedge engaging sections is adapted to engage with a series of wedge members which act as chocks to restrain the rolling of rolls of laminar stock for shipment on a pallet.

Still a further goal of the invention is to provide an inter-engaging pallet pad, incorporating wedge engaging sections, with a series of pairs of wedge members for securely retaining at least one roll of laminar stock on a pallet in an upright orientation without rolling about or off the pallet.

Yet a further goal of the invention is to provide an improved edge protecting packaging and distribution system for rolled laminar stock to control shipments of rolls of paper shipped in an upright orientation.

Still yet another goal of the invention is to provide an improved wedge system consisting of inter-engaging pallet pad and a series of wedges, each of which are formed from corrugated paper which, when assembled and interconnected, form a secure cradle for one or more rolls of fine paper loaded in an upright orientation for shipment and distribution.

Yet still a further goal of the invention is to provide an improved edge protecting packaging and distribution system for rolled laminar stock incorporating a pallet pad and a series of wedges which are formed of recyclable material.

Still another goal of the invention is to provide an improved packaging and distribution system for rolled laminar stock in which a series of wedges engaging with a pallet pad, on top of a standard shipping pallet, are used in which the paper may be released by exerting pressure on a tear-away wedge section without damaging either the edges or the surface of the laminar material.

Still yet another goal of the invention is to provide a recyclable corrugated cardboard system for shipping fine papers in an upright orientation on pallets in which an integrated wedge and pallet pad system used to store and ship the paper and a tear-away feature enables nondestructive unloading of the rolls.

Still other goals and advantages of the invention will in part be obvious and will in part be apparent from the specification.

The invention accordingly comprises the features of construction, combinations of elements and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which.

DETAILED DESCRIPTION OF THE PREFERRED EMBODIMENTS

Figure 1:
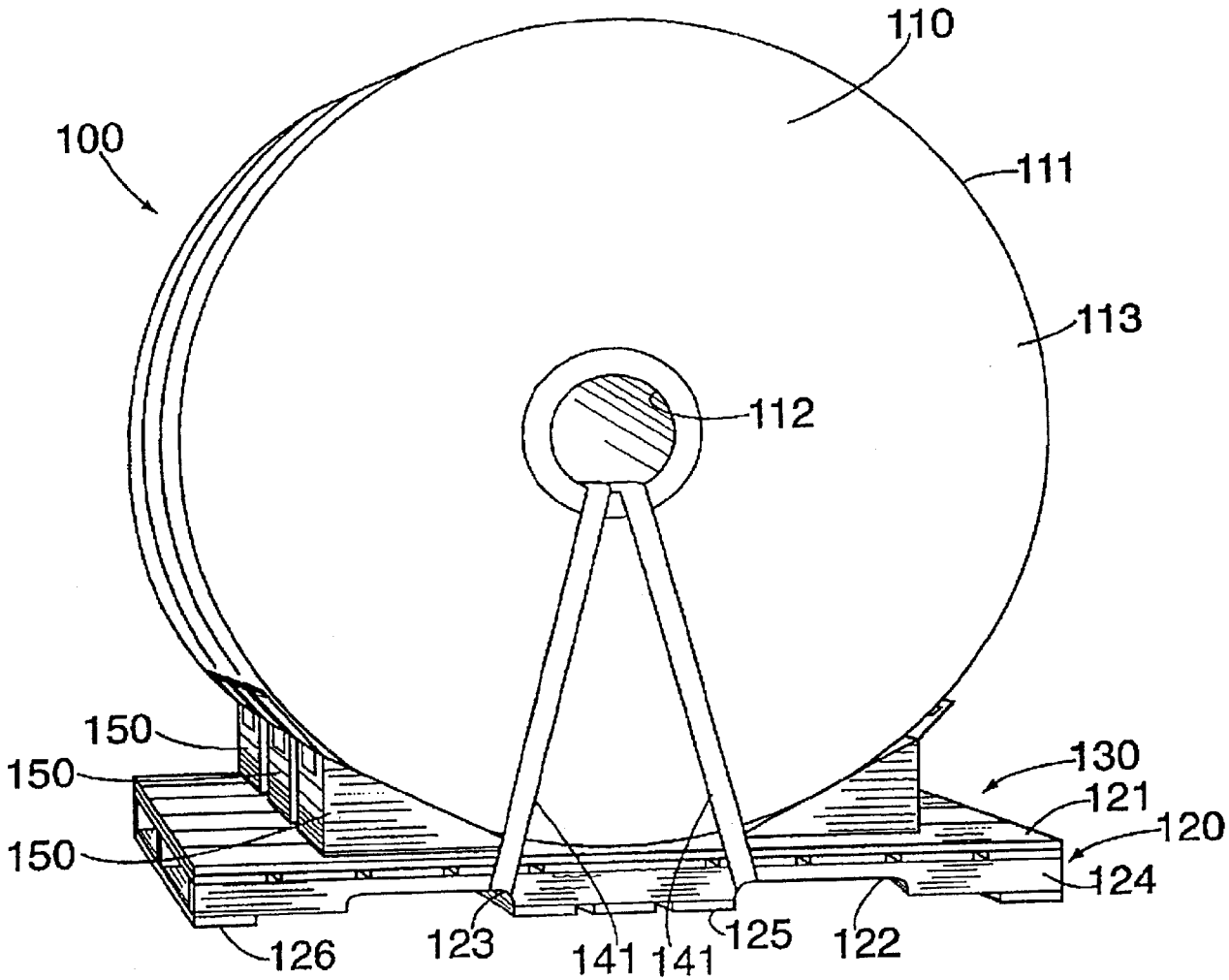
FIG. 1 is a perspective view of three rolls of paper packaged in accordance with an edge protecting packaging distribution system for rolled laminar stock in accordance with a preferred embodiment of the invention.

Reference is first made to FIG. 1, wherein an edge protecting packaging and distribution system for rolled laminar stock constructed in accordance with a preferred embodiment of the invention, generally indicated as 100, is depicted. Like elements are represented by like reference numerals. System 100 includes, in a preferred embodiment, three rolls of paper 110 having an outer surface of the paper 111, an inner circular opening 112, with or without a core, and an edge surface 113. In practice, each of the three rolls of paper 110 has two edge surfaces 113. Like elements are represented by like reference numerals. In the configuration shown in FIG. 1 the two outer rolls of paper 110 have a single edge surface 113 exposed and middle roll of paper 110 has both edge surfaces 113 adjacent to the covered edge surfaces of the end rolls of paper. Each of rolls 110 is positioned so as to enable the entire roll to be easily moved off of system 100 when retaining straps 191 and 192 are removed and one or more wedge members 150 are likewise removed. In this orientation rolls 110 can rotate about their inner openings 112 along outer surface 111 for suitable handling.

As shown in FIG. 1, rolls 110 of paper are securely maintained in place by their significant mass, the wedge members 150 and retaining straps 191 and 192.

Roll 110 sits upon a pallet 120, having a top surface 121, recessed surfaces 122 and 123, adapted to receive retaining straps 191 and 192, and three supporting legs 124, 125 and 126. A pallet pad 130 rests on top of top surface 121 of pallet 120. Further description of the configuration of pallet pad 130 is made below with reference to FIGS. 2 and 7. A more detailed description of wedge members 150 is found below with reference to FIGS. 3–6. In practice, edge protecting packaging distribution system 100 is assembled upon pallets 120 at the paper manufacturing and distribution site.

Figure 2:
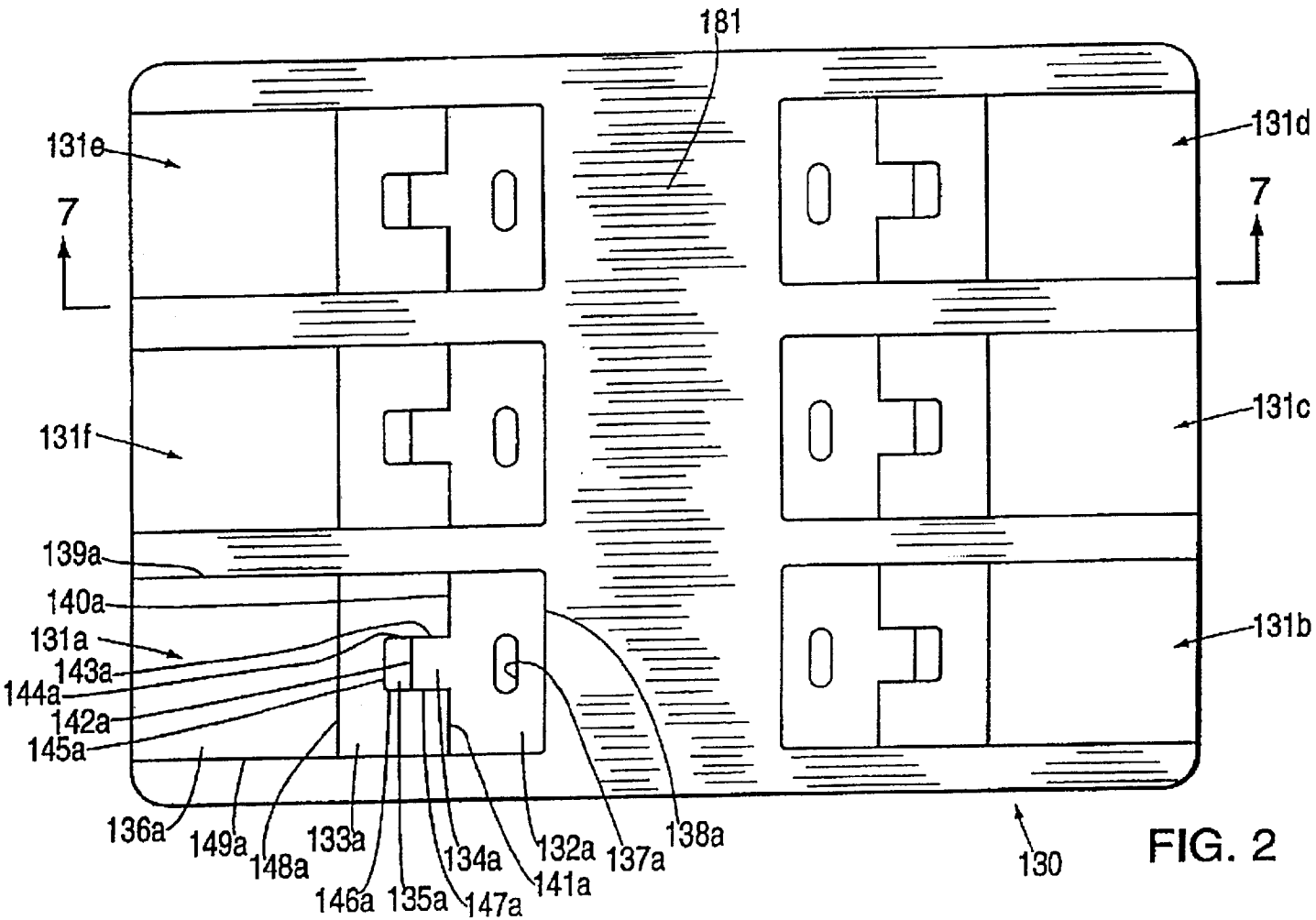
FIG. 2 is a top plan view of a pallet pad, after manufacture and prior to assembly, constructed in accordance with a preferred embodiment of the invention.
Figure 7:
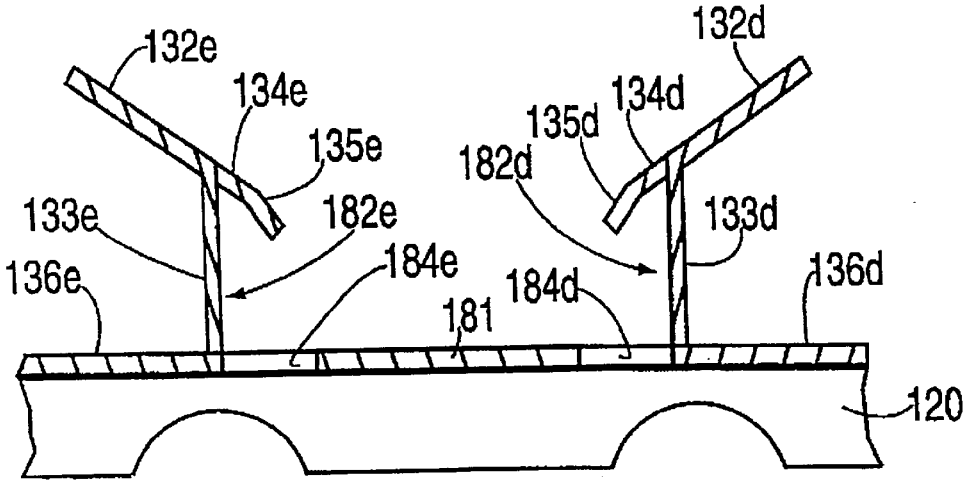
FIG. 7 is a cross-sectional view along line 7—7 of FIG. 2 of the pallet pad of FIG. 2 in an assembled position, without the wedge members, in accordance with a preferred embodiment of the invention.

A pallet 120 has a pallet pad 130 of the type shown in FIGS. 2 and 7 placed on top of surface 121 of pallet 120. Pallet pad 130 is assembled from the die cut form shown in FIG. 2 so as to form the configuration shown generally in FIG. 7. Assembled wedge members 150 are then secured in place to form the configuration shown in FIG. 8. Then the rolls of paper 110 are added to create the combination shown in FIG. 9. Finally, any final wrapping and then retaining straps 191 and 192 are added. While it is possible to add additional protective coverings or layers onto or over the finished edge protecting packaging distribution system 100, in most cases such additional protection is not required.

Reference is next made to FIG. 2, wherein a pallet pad generally indicated as 130 constructed in accordance with a preferred embodiment of the invention is depicted. Pallet pad 130 is generally formed in a preferred embodiment out of a double wall corrugated cardboard sheet formed to have the same size as the pallet 120 upon which the system 100 will rest. In a preferred embodiment the pallet pad is set at dimensions of 52 inches by 37 inches with rounded corners. Pallet pad 130 is formed with six wedge engaging sections, generally indicated as 131a, 131b, 131c, 131d, 131e and 131f. Each of these wedge engaging sections 131a–f is identical to each other section in size, stamping and configuration except that wedge engaging sections 131a, e and f are mirror images of sections 131b, c and d along a vertical line between them in FIG. 2. For ease of description and without loss of detail we will focus on wedge engaging section 131a. Each of the other wedge engaging sections 131b–f will have similar elements.

Wedge engaging section 131a has a handle section 132a, vertical wedge supporting section 133a, including continuous engaging arm 134a and angled engaging arm 135a. Finally, wedge engaging section 131a includes a tear-away section 136a. In order to form the configuration shown in FIG. 7, the pallet pad 130 is die cut in accordance with conventional corrugated cardboard forming techniques by cutting through various walls, perforating other walls and heavily and lightly scoring lines as appropriate.

In wedge engaging section 131a, generally oval handle opening 137a is formed by die cutting out the entire interior of handle opening 137a. This forms a handle as can also be seen in FIG. 1 and FIG. 8. The entire outer surface of sections 132a and 133a extending from the intersection of line 148a with the outer perimeter of wedge engaging section 131a, indicated as edge 138a is die cut through so that it may move freely from the surrounding area. Likewise, walls 143a, 144a, 145a, 146a and 147a surrounding members 134a and 135a are die cut cleanly to allow these two sections to move freely apart from the surrounding portion of section 133a. In addition, lines 140a and 141a separating sections 132a and 133a, as well as line 148a separating sections 133a and 136a are heavily scored. Heavy scoring, again in accordance with standard industry practice, has the effect of allowing the corrugated cardboard to easily fold in both directions along the heavily scored line. Line 142a, which separates sections 134a and 135a, is lightly scored to allow section 135a to bend downward, into the plane of the drawing of FIG. 2 and toward section 134a along line 142a (as seen in FIG. 7), but not to bend in the opposite direction along line 142a. Finally, side lines 139a and 149a of tear-away section 136a are perforated. In a preferred embodiment, the perforation is on a three to one scale, meaning that only one fourth of lines 139a and 149a remains intact, the remaining three quarters of lines 139a and 149a having been die cut. This allows for section 136a to be removed from pallet pad 130 with suitable force.

As noted above, each of remaining wedge engaging sections, 131b–f have similar elements and construction which, for purposes of clarity, are not repeated herein.

Figure 3:
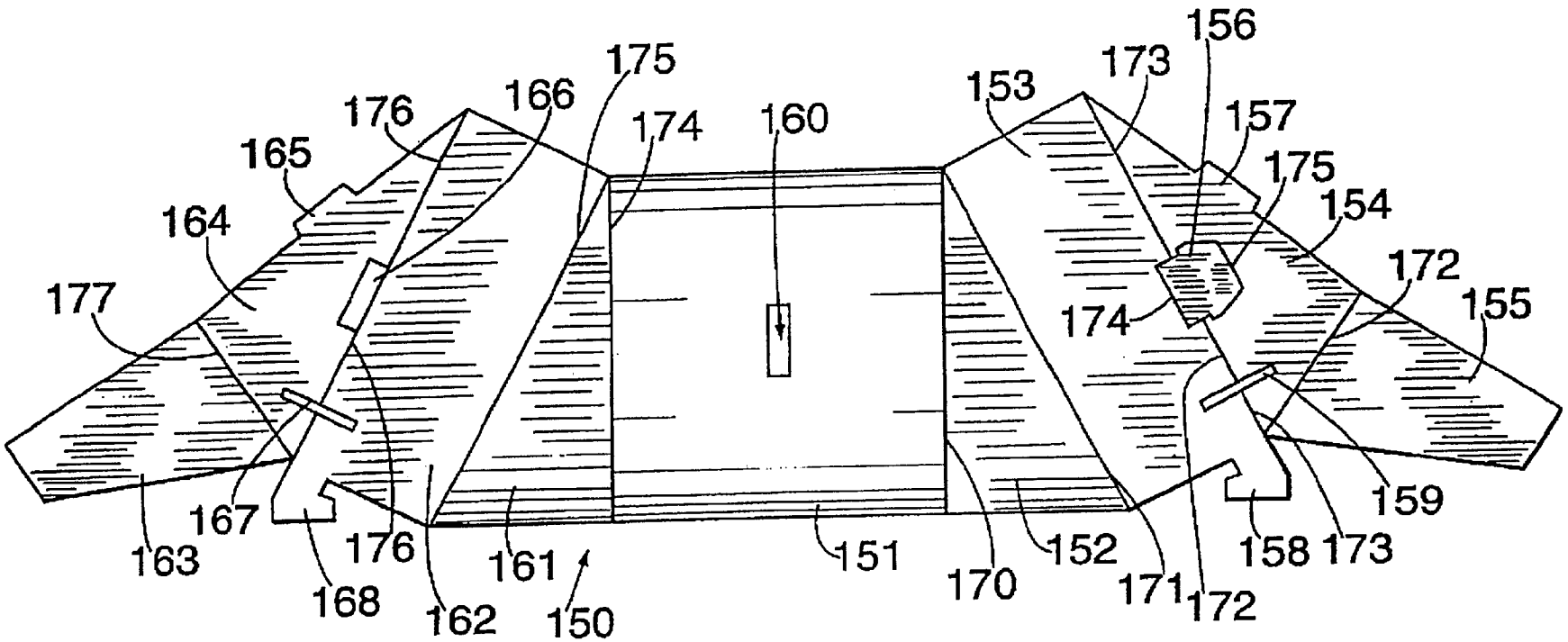
FIG. 3 is a top plan view of a wedge member after manufacture and prior to assembly constructed in accordance with a preferred embodiment of the invention.

Reference is next made to FIG. 3 wherein a die cut form for the wedge member, generally indicated as 150, constructed in accordance with a preferred embodiment of the invention, is depicted. In FIG. 3, a single wedge member in its flat, unfolded and unassembled form, as formed by die cutting and scoring in accordance with conventional corrugated cardboard technology is depicted. In FIG. 3, a single wedge member 150 is shown. In practice, a single die cutting process forms two wedge members 150 with a second wedge member 150 positioned as a mirror image to the member 150 shown in FIG. 3 connected along the straight line at the bottom of sections 152, 151 and 161. This sort of duplication is commonly known and used in the art and does not form a part of the invention. Accordingly, for ease of description and explanation of the inventive elements of applicant's edge protecting packaging distribution system for rolled laminar stock, only a single form for a wedge member 150 is depicted.

Wedge member 150 includes a base section 151, a triangular side section 152, top section 153, support walls 154, 155, locking plug 156, support tab 157, connecting tab 158 and connecting slot 159. In addition, wedge section 150 also includes triangular side section 161, top section 162, support walls 163, 164, support tab 165, locking plug slot 166, connecting slot 167, connecting plug 168 and support tabs receiving slot 160. In a preferred embodiment, the entire outside perimeter of wedge section 150 is die cut from double wall—HT corrugated cardboard in accordance with industry practice. Other types of corrugated cardboard may be used depending upon weight and strength requirements.

In addition to the outside die cutting, connecting slots 159 and 167, locking plug slot 166 and support tabs receiving slot 160 are die cut and punched out. In addition, locking plug 156 is die cut around its perimeter along line 175. Line 174 is lightly scored to allow locking plug 156 to rotate along line 174 out of the plane of FIG. 3. Lines 171 connecting triangular side section 152 and top section 153, line 173 connecting top section 173 and support wall 154 (except in the area of connecting slot 159 and locking plug 156) and line 172 connecting support walls 154, 155 are heavily scored to allow folding in both directions along these lines. Likewise, line 174 connecting base section 151 to triangular side section 161, line 175 connecting triangular side section 161 to top section 162, line 176 connecting top section 162 to support wall 164 (except in the regions of connecting slot 167 and locking plug slot 166) and line 177 connecting support wall 163 to support wall 164 are heavily scored to allow folding into the plane of FIG. 3.

Figure 4:
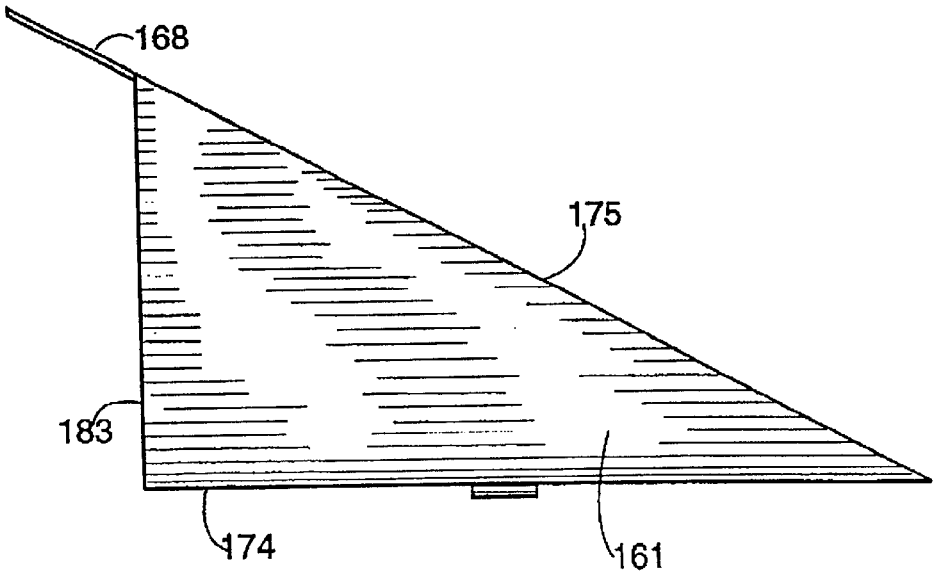
FIG. 4 is a side elevational view of the wedge member of FIG. 3 constructed and assembled in accordance with a preferred embodiment of the invention.
Figure 5:
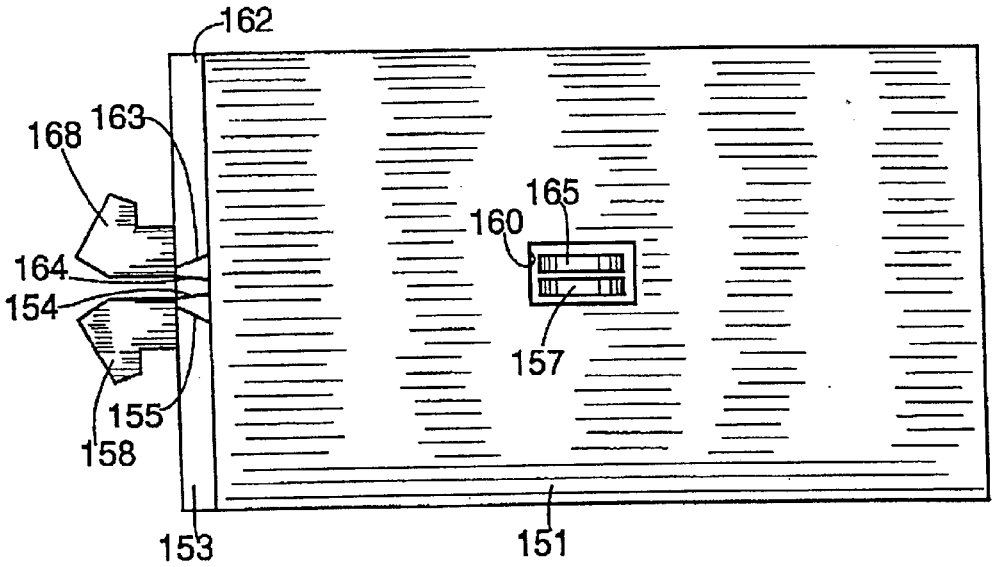
FIG. 5 is a bottom elevational view of the wedge member of FIG. 4.
Figure 6:
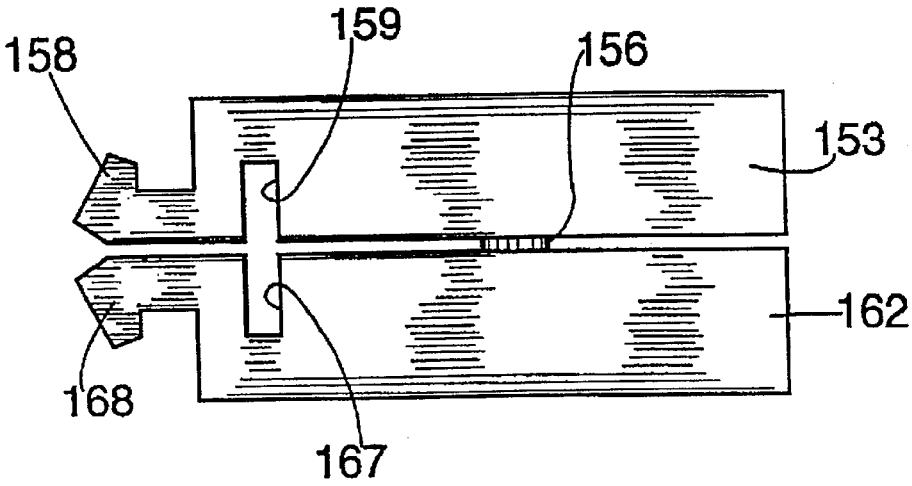
FIG. 6 is a top plan view of the wedge member of FIG. 4.

Wedge member 150 is assembled in the following manner. Support wall 155 is folded inwardly toward support wall 154 and then support walls 154 and 155 are rotated inwardly along line 173 until the edge of support wall 155 proximate to connecting plug 158 rests against the surface of top section 153. Thereafter top section 153 is rotated about line 171 until the smallest side of support wall 155 contacts triangular side section 152. Next triangular side section 152 is rotated about line 170 until the last free section of support wall 155 rests against the inside of base section 151 and tab 157 extends through support tabs receiving slot 160. In this orientation locking plug 156 remains in the same plane as top section 153. In this orientation support wall 155 is supported on each of its three free sides by either base section 151, triangular side section 152 or top section 153. Likewise, the free end of support wall 154, including support tab 157, is supported on base section 151, with support tab 157 extending through support tabs receiving slot 160. Next, support wall 163 is rotated inward about line 177 and support wall 164 is rotated about line 176 until the free side of support wall 163 closest to connecting plug 168 contacts the surface of top section 162. Then, top section 162 is rotated about line 175 until the shortest side of support wall 163 rests against triangular side section 161. Then, triangular side section 161 is rotated about line 174 until the free end of support wall 164 rests up against the base of support member 151 and tab 165 extends through slot 160. In addition, at this point, locking plug 156 enters locking plug slot 166, generally locking the wedge member 150 into its assembled condition. In this assembled condition top sections 153 and 162 form a generally uniform single plane and the exposed portions of connecting slots 167 and 159 form a single slot. Connecting plugs 158 and 168, as can be seen in FIGS. 4, 5 and 6, extend outwardly beyond the end of the wedge. In addition, the inside of the wedge is further supported by support walls 154 and 164 resting against each other and the fourth, connected, walls of support walls 163 and 155 (lines 172 and 173), rest against each other to further provide structural rigidity to wedge 150.

As seen in FIG. 4, the side elevational view, triangular side section 161 forms the side wall and line 175 forms the edge between triangular side section 161, which is seen in FIG. 5, and top section 162 shown in FIG. 6. Likewise, line 174, which forms the bottom edge of triangular side section 161, connects with base section 151 shown in FIG. 5. Support tab 165 can be seen extending below base section 151. Likewise, connecting plug 168 can be seen extending beyond the end of top section 162.

In FIG. 6, which shows the top elevational view one can see that slots 159 and 167 together form a single continuous slot, for receiving and locking with engaging sections 135 of the wedge engaging sections 131 of pallet pad 130.

Reference is made to FIG. 2 and, in particular, FIG. 7 for a description of the manner in which each of wedge engaging sections 138a–f folds and engages with wedge members 150. To prepare pallet pad 130 for assembly one pulls up on handle opening 137a in section 132a and pulls section 132a to the left, rotating about lines 148a, between sections 136a and 133a, and lines 140a and 141a between sections 132a and 133a. As seen in FIG. 7, one pulls back on handle 132a by slipping one's fingers through handle hole 137a, until section 133a is generally perpendicular to the plane of pallet 130. At this point, bracing wall 133a is vertical, handle section 132a is angled backwards over tear-away section 136a and connecting section 134a and engaging section 135a extend outwardly along the continued plane of handle section 132. In this position, an opening 182, formed by the die cutting of connecting section 134 and engaging section 135 in support wall 133 is formed.

As seen in FIG. 7, there is a section 184a of pallet 120 which is not covered by pallet pad 130. This is the section evacuated by the folding of handle section 132a, support wall 133a, connecting section 134a and engaging section 135a. This uncovered section is then covered by a wedge section 150.

An assembled wedge section 150 is coupled to wedge engaging section 131 by extending connecting plugs 158 and 168 through opening 182a in support wall 133a. Then, engaging section 135a is bent down and slid into the slot formed by slots 159 and 167. Between the engagement of connecting plugs 158 and 168 into opening 172, with the outward engagement of the arms of plugs 158 and 168 with the sides of opening 182a preventing their release, connection section 134 resting on top sections 153a and 162a and engaging section 135 extending into openings 159 and 167, wedge members 150, with its vertical triangular leg shown in FIG. 4 as leg 183, is locked firmly up against vertical supporting wall 133a of wedge engaging section 131a. This combination also has the effect of maintaining supporting wall 133 in a vertical alignment. The width of wedge member 150 is designed to be approximately the same width as wedge engaging section 131 including handle section 132, vertical support wall 133 and tear-away section 136.

Figure 8:
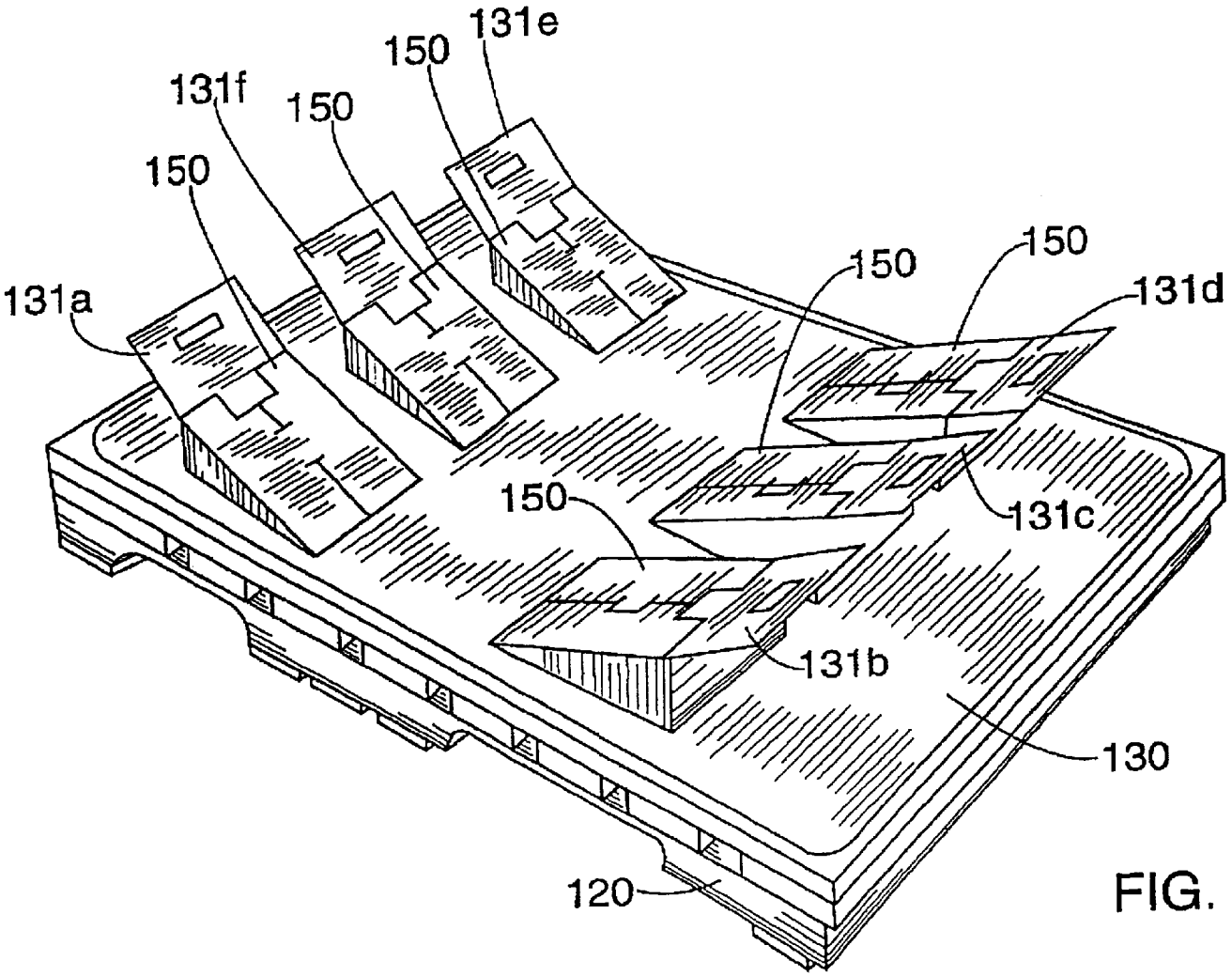
FIG. 8 is a perspective view of the cradle of the edge protecting packaging and distribution system for rolled laminar stock assembled, but without any rolls of paper present.

As shown in FIG. 8, when fully assembled in a preferred embodiment, there are a series of six wedge members 150, each of which is connected to one of the six wedge engaging sections 131a–f. There may be more or less wedge members 150 depending upon the size of the pallet, the width of the paper and the particular needs of the manufacturing plant and end user. Generally, however, the wedge sections would be paired so that each pair of wedge members 150 cradles a paper roll 110.

As shown in FIG. 8, it appears as if wedge members 150 are resting on top of pallet pad 130. However, as shown in FIG. 7, pallet pad 130 is generally absent in the areas 184a–f in which wedge member 150 is present, that portion of pallet pad 130 forming wedge engaging sections 131a–f.

After the edge protecting packaging and distribution system for the rolled laminar sheets is prepared, as shown in FIG. 8, a cradle for a series of rolls of laminar material such as fine paper for printing uses is established and the paper may then be loaded onto the cradle arrangement created as shown in FIG. 8.

Figure 9:
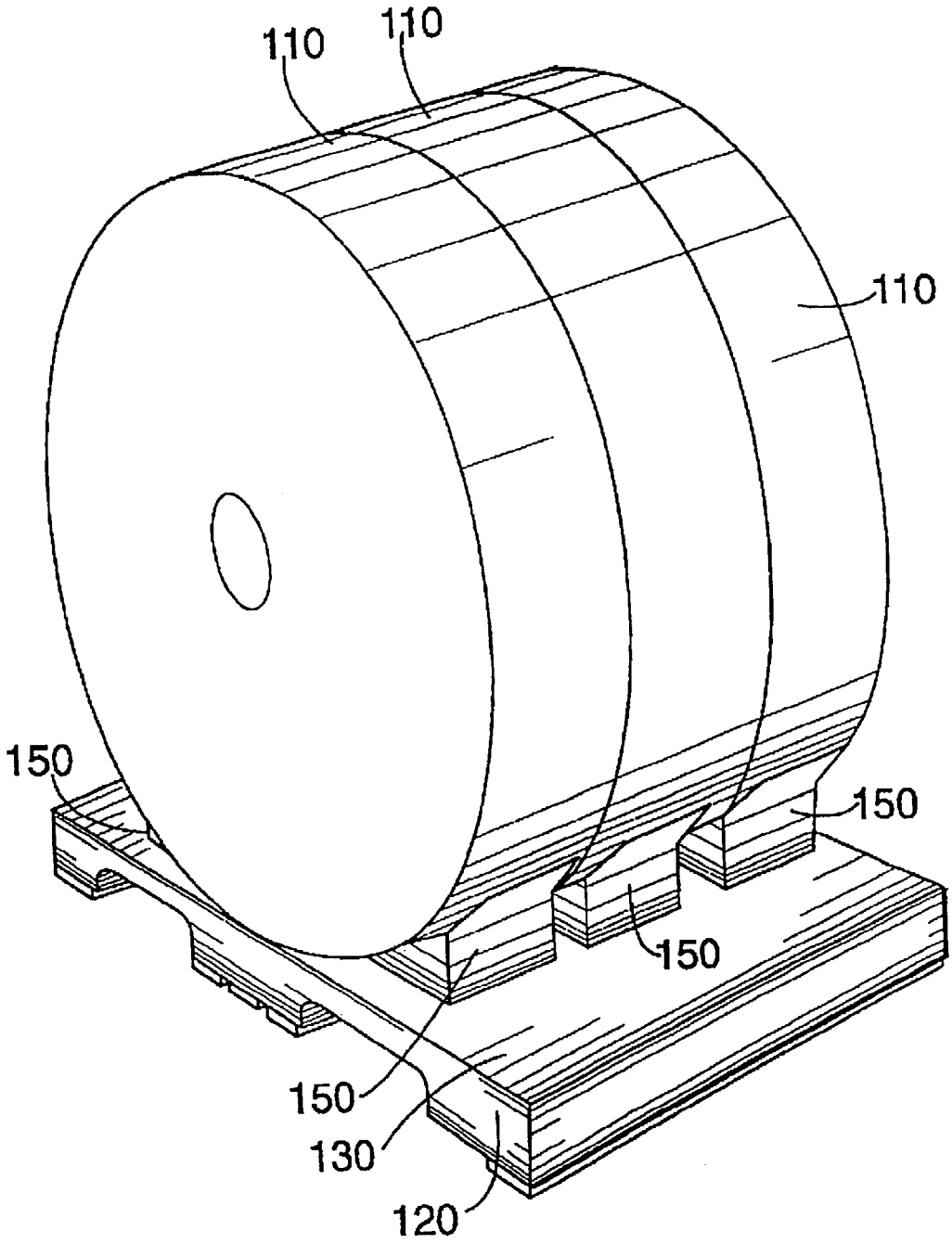
FIG. 9 is a perspective view of the edge protecting packaging and distribution system of FIG. 8 wherein the paper has been added onto the system.

Reference is next made to FIG. 9 wherein a series of three rolls of fine paper 110 have been lowered onto the cradle formed in FIG. 8 of pallet pad 130 and the six wedge members 150 interconnecting with wedge engaging sections 131a–f. Each of the rolls of paper 110 may be individually wrapped, wrapped in a bundle together with the other rolls of paper or may be left without any wrapping. The wrapping may be either in the form of a heavy grade paper or of a thin plastic sheet in accordance with conventional paper wrapping techniques. In a preferred embodiment, each of the individual rolls of paper is separately wrapped prior to placement on the cradle formed shown in FIG. 8.

Most of the weight of the paper rolls 110 rests upon the central region 181 of pallet pad 130. The weight has the effect of compressing but not destroying the pallet pad 130 underneath the paper rolls. Following the placement of rolls 110 into the cradle assembly, generally indicated as 200 constructed in accordance with a preferred embodiment of the invention, the paper rolls 110 may be strapped and/or stretch wrapped to the pallets. In some embodiments one strap extends over the top of the rolls of paper and under the bottom of the pallet. In another, a single strap through the core of the paper rolls 110 may be utilized, or one strap arranged in a downwardly opening "V" shape as shown in FIG. 1 may be utilized, or no strapping may be utilized. In the event that no strapping is utilized then, generally, the paper is secured in place by stretch or shrink wrapping the entire assembly. Stretch or shrink wrapping may also be utilized in combination with the strapping.

In practice, the currently preferred approach is to use "V" shaped strapping through the core of paper rolls 110 without any outside stretch wrapping. This configuration has the dual advantages of maintaining a secure, stable and edge protective packaging distribution system while maintaining a highly recyclable packaging and distribution system.

Once the paper rolls 110 are loaded on the cradle, generally indicated as 200, to form the edge protective packaging distribution system 100 as shown in FIG. 1, the paper may then be shipped and distributed as necessary to its end user. The end user is generally a high volume print shop incorporating roll in-feed devices which use paper on rolls directly without the need for pin-feed borders, which waste time, manpower and packaging.

When the end user desires to remove a roll of paper from the cradle system, the first step is to cut the straps which secure the paper in place or remove any overall wrapper. With the straps removed, the paper rolls 110 are retained in place so long as pallet 120 rests on a flat surface and is not moved around or shaken. At this point the user would grab one of the handles 132a–f by inserting fingers through handle hole 137a–f and pulling outwardly from the paper roll 110 so as to remove wedge member 150 from the side of a roll 110. This removal is enabled by the use of the handle 132a, the shape of wedge 150 and the manner in which tear-away section 136a is formed with perforation on its sides (lines 193a and 149a), so as to allow the entire wedge member 150 and wedge engaging section 131a to be completely removed. So as to avoid damage to the paper, the width of wedge 150 and wedge engaging section 131a is less than the width of the roll of paper 110. This is so that the removal of wedge 150 and wedge engaging section 131a by pulling wedge 150 from the side of a paper roll 110 does not cause roll 110 to contact pallet 120. Rather, roll 110 rides on the adjacent portions of pallet pad 130 which act as two rails for support so that the surface of the paper is not damaged. In this way, a single roll at a time can be removed when needed while the remaining rolls are cradled and kept firmly in check on pallets 120 without the need for other stabilizing activity or new maintenance.

Figure 10:
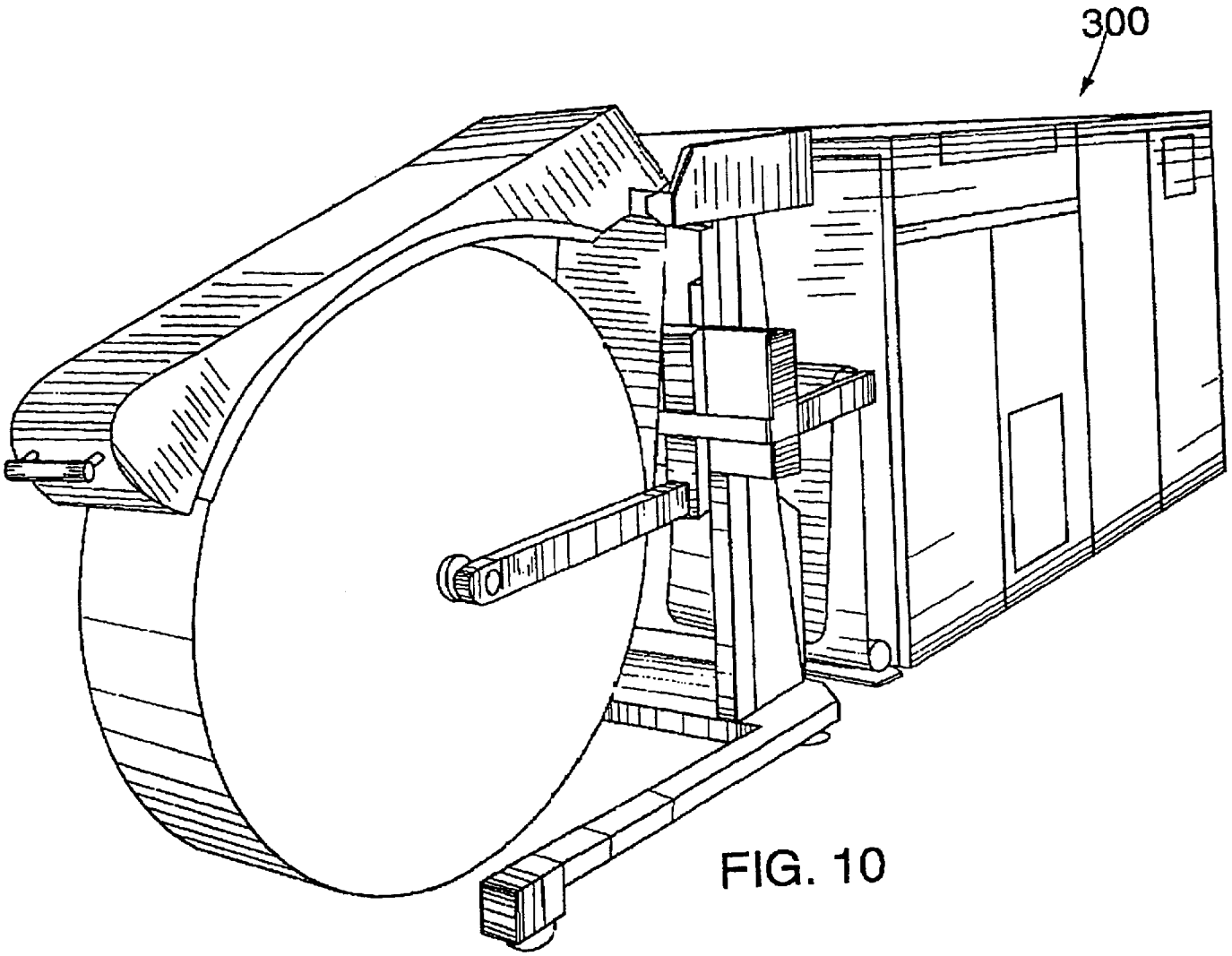
FIG. 10 is a perspective view of a printer incorporating the roll-in feed device utilizing the rolled paper without pin-feed borders.

Generally, a utility cart of the appropriate height and weight bearing capacity is used to remove the roll of paper from pallet pad 130. Then, the paper is brought to a printing machine, generally indicated as 300 shown in FIG. 10 wherein roll 110 automatically feeds the paper into the machine where it is cut to size and printed upon as appropriate. While the system has been shown with three pairs of wedge members for three rolls of paper, various other configurations consistent with the invention are possible. More or less pairs of wedges may be used. In addition, one or more wider wedges on one side of the cradle may be used to block movement of more than a single roll of paper. Then, one can assure that all rolls are off-loaded only in one direction, where there is a single wedge member for each paper roll. This may be useful to assure that the paper rolls are properly aligned for use in manufacturing with the roll unwinding in the proper direction. In the event of very wide rolls of common stock, multiple wedges can be used with, at or proximate to the edges or distributed so that the rolls are not damaged when they roll off the pallet pad and better control is achieved.

While the description has been focused on the packaging and distribution of rolls of paper, the system is usable also in connection with rolls of other laminar or sheet like materials such as plastics, metals and fabrics, where protection of the edge surfaces of the roll from the weight of the roll itself is desirable.

In accordance with this system the basic packaging and distribution system is essentially recyclable or reusable. All of the corrugated cardboard parts such as wedge members 150 and pallet pad 130 are completely recyclable. Pallets, in accordance with industry practice, are reused repeatedly. Depending on the strapping material utilized it, too, may be reused or recycled. Finally, the wrapping or shrink wrapping of the rolls or the overall structure may be utilized to create a secure packaging system 100. The various corrugated cardboard parts may be configured in different arrangements to meet varying weight and size needs out of other corrugated paper products or even plastic corrugated construction materials.

In this way an improved edge protecting packaging and distribution system constructed in accordance with a preferred embodiment of the invention is depicted in which by use of a combination of a die cut corrugated cardboard pallet pad and an interengaging series of die cut cardboard wedge members a highly recyclable system is enabled. The combination of the pallet pad and wedge members forms a secure and stable base for paper on its edge to be stored and shipped without damage to the edge of the paper or other laminar sheet material.

The cradle arrangement for holding the rolled paper protects the edges of the paper against damage from contact or the weight of the paper itself. By use of the combination of a pallet pad with wedge engaging portions and a series of wedge members, a secure cradle which may be selectively opened by pulling back on the wedge form and pulling away an entire portion of the base so as to allow free movement by the paper roll is presented.

Finally, a high quality, highly recyclable, edge protecting packaging distribution system for rolled laminar sheets incorporating a pallet based pad and engaging wedge form system is provided.

It will thus be seen that the goals set forth above, among those made apparent from the preceding description are efficiently attained and, since certain changes may be made in the above constructions without departing from the spirit and scope of the invention, it is intended that all of the matter contained in the above description or shown in the accompanying drawings, shall be interpreted as illustrative, and not as limiting.

It is also to be understood that the following claims are intended to cover all of the generic and specific features of the invention, herein described, and all statements of the scope of the invention which, as a matter of language, might be said to fall therebetween.

What is claimed is:

1. A protective cradle for a roll of laminar stock rollingly oriented on its outer surface on a pallet, comprising:

pallet covering means on the pallet for covering at least a portion of the pallet, supporting and cushioning the roll of laminar stock;

wedge means, coupled to the pallet covering means and contacting the roll of laminar stock proximate a portion of the pallet covering means supporting the roll of laminar stock, for preventing the roll of laminar stock form rolling; and said wedge means including handle means for selectively removing at least a portion of the wedge means from contact with the roll of laminar stock.

2. The protective cradle of claim 1 wherein the wedge means includes at least one pair of wedge shaped members, each member of a pair of wedge shaped members being placed against the outer surface of the rolled laminar stock on an opposite side of the roll supporting portion of the pallet covering means than the other member of the pair of wedge shaped members so that the roll is trapped between the at least one pair of wedges.

3. The protective cradle of claim 2 wherein there are three pairs of wedge shaped members, each of which cradles one of three rolls of paper.

4. The protective cradle of claim 1 wherein the wedge means includes a first and a second wedge shaped member, the first wedge shaped member being placed against the outer surface of the roll of laminar stock on a first side of the roll supporting portion of the pallet covering means, and the second wedge shaped member is placed against the outer surface of the rolled laminar stock on a second side of the roll supporting portion of the pallet covering means, the first and second sides being on opposite sides of the roll supporting portion, so that the roll is trapped between the first and second wedge shaped members.

5. The protective cradle of claim 1 wherein the pallet covering means further includes wedge securing means for engaging and coupling with the wedge means so that the wedge means is securely fastened to the pallet covering means.

6. The protective cradle of claim 2 wherein the pallet covering means further includes wedge securing means for engaging and coupling with each of the wedge shaped members so that the wedge shaped members are securely fastened to the pallet covering means.

7. The protective cradle of claim 5 wherein the wedge securing means includes the handle means, coupled to the wedge means, for selectively removing the wedge means from contact with the roll of laminar stock.

8. The protective cradle of claim 6 wherein the wedge securing means includes the handle means coupled to each of the wedge shaped members for selectively removing wedge shaped members from contact with the roll of laminar stock.

9. The protective cradle of claim 1 wherein the pallet covering means includes a selectively removable portion, proximate the wedge means, said selectively removable portion disengaging from the pallet covering means when the wedge means is removed from contact with the roll of laminar stock.

10. The protective cradle of claim 7 wherein the pallet covering means includes a selectively removable portion, proximate the handle means, said selectively removable portion disengaging from the pallet covering means when the wedge means is removed from contact with the roll of laminar stock by the handle means.

11. The protective cradle of claim 1 wherein substantially the entire pallet is covered either by the pallet covering means or the wedge means.

12. The protective cradle of claim 11 wherein the pallet covering means covers the pallet except where the wedge means covers the pallet.

13. The protective cradle of claim 1 wherein the roll of laminar stock is a roll of paper for use without a pin-feeding border.

14. The protective cradle of claim 1 wherein the pallet covering means and wedge means are formed of corrugated cardboard to allow recycling of the protective cradle.

15. The protective cradle of claim 1 wherein the wedge means is formed of a series of wedge shaped members, each of which is formed of a folded corrugated cardboard form.

16. The protective cradle of claim 15 wherein the corrugated cardboard form for each of the wedge shaped members is a single sheet, die cut, recyclable member which is adapted to be folded into a stable, wedge shaped member without the need for additional connectors or adhesives.

17. A protective cradle for a roll of laminar stock rollingly oriented on a pallet, comprising:

pallet covering means on the pallet for covering at least a portion of the pallet, supporting and cushioning the roll of laminar stock;

wedge means, coupled to the pallet covering means and contacting the roll of laminar stock proximate a portion of the pallet covering means supporting the roll of laminar stock, for preventing the roll of laminar stock from rolling and, handle means coupled to the wedge means for selectively removing at least a portion of the wedge means from contact with the roll of laminar stock.

18. The recyclable protective cradle of claim 17 wherein the wedge means includes at least one pair of wedge shaped members, each member of a pair of wedge shaped members being placed against the outer surface of the rolled laminar stock on an opposite side of the roll supporting portion of the pallet covering means than the other member of the pair of wedge shaped members so that the roll is trapped between the at least one pair of wedges.

19. The recyclable protective cradle of claim 18 wherein there are three pairs of wedge shaped members, each of which cradles one of three rolls of paper.

20. The recyclable protective cradle of claim 17 wherein the wedge means includes a first and a second wedge shaped member, the first wedge shaped member being placed against the outer surface of the roll of laminar stock on a first side of the roll supporting portion of the pallet covering means, and the second wedge shaped member is placed against the outer surface of the rolled laminar stock on a second side of the roll supporting portion of the pallet covering means, the first and second sides being on opposite sides of the roll supporting portion, so that the roll is trapped between the first and second wedge shaped members.

21. The recyclable protective cradle of claim 17 wherein the pallet covering means further includes wedge securing means for engaging and coupling with the wedge means so that the wedge means is securely fastened to the pallet covering means.

22. The recyclable protective cradle of claim 18 wherein the pallet covering means further includes wedge securing means for engaging and coupling with each of the wedge shaped members so that the wedge shaped members are securely fastened to the pallet covering means.

23. The recyclable protective cradle of claim 21 wherein the wedge securing means includes the handle means, coupled to the wedge means, for selectively removing the wedge means from contact with the roll of laminar stock.

24. The recyclable protective cradle of claim 22 wherein the wedge securing means includes the handle means coupled to each of the wedge shaped members for selectively removing wedge shaped members from contact with the roll of laminar stock.

25. The recyclable protective cradle of claim 17 wherein the pallet covering means includes a selectively removable portion, proximate the wedge means, said selectively removable portion disengaging from the pallet covering means when the wedge means is removed from contact with the roll of laminar stock.

26. The recyclable protective cradle of claim 23 wherein the pallet covering means includes a selectively removable portion, proximate the handle means, said selectively removable portion disengaging from the pallet covering means when the wedge means is removed from contact with the roll of laminar stock by the handle means.

27. The recyclable protective cradle of claim 17 wherein the roll of laminar stock is a roll of paper for use without a pin-feeding border.

28. The recyclable protective cradle of claim 17 wherein the pallet covering means and wedge means are formed of corrugated cardboard to allow recycling of the protective cradle.

29. The recyclable protective cradle of claim 17 wherein the wedge means is formed of a series of wedge shaped members, each of which is formed of a folded corrugated cardboard form.

30. The recyclable protective cradle of claim 17 wherein the corrugated cardboard form for each of the wedge shaped members is a single sheet, die cut, recyclable member which is adapted to be folded into a stable, wedge shaped member without the need for additional connectors or adhesives.

31. An edge protective packaging and distribution system for a roll of laminar stock rollingly oriented on its outer surface on a pallet, comprising:

a cradle, resting on the pallet, for supporting and preventing rolling of the rolls on the pallet, said cradle including pallet covering means, wedge means and handle means proximate the wedge means and, the pallet covering means being placed on the pallet for covering at least a portion of the pallet, supporting and cushioning the roll of laminar stock, and the wedge means, being coupled to the pallet covering means and contacting the roll of laminar stock proximate a portion of the pallet covering means supporting the roll of laminar stock, for preventing the roll of laminar stock from rolling, the handle means enabling the selectively removal of at least a portion of the wedge means from contact with the roll of laminar stock;

strapping means coupled to the roll and the pallet for securing the roll on the cradle to the pallet.

32. The edge protective packaging and distribution system of claim 31 wherein the cradle is formed of recyclable material.

33. The edge protective packaging and distribution system of claim 31 wherein the wedge means includes at least one pair of wedge shaped members, each member of a pair of wedge shaped members being placed against the outer surface of the rolled laminar stock on an opposite side of the roll supporting portion of the pallet covering means than the other member of the pair of wedge shaped members so that the roll is trapped between the at least one pair of wedges.

34. The edge protective packaging and distribution system of claim 33 wherein there are three pairs of wedge shaped members, each of which cradles one of three rolls of paper.

35. The edge protective packaging and distribution system of claim 31 wherein the wedge means includes a first and a second wedge shaped member, the first wedge shaped member being placed against the outer surface of the roll of laminar stock on a first side of the roll supporting portion of the pallet covering means, and the second wedge shaped member is placed against the outer surface of the rolled laminar stock on a second side of the roll supporting portion of the pallet covering means, the first and second sides being on opposite sides of the roll supporting portion, so that the roll is trapped between the first and second wedge shaped members.

36. The edge protective packaging and distribution system of claim 31 wherein the pallet covering means further includes wedge securing means for engaging and coupling with the wedge means so that the wedge means is securely fastened to the pallet covering means.

37. The edge protective packaging and distribution system of claim 33 wherein the pallet covering means further includes wedge securing means for engaging and coupling with each of the wedge shaped members so that the wedge shaped members are securely fastened to the pallet covering means.

38. The edge protective packaging and distribution system of claim 36 wherein the wedge securing means includes the handle means, coupled to the wedge means, for selectively removing the wedge means from contact with the roll of laminar stock.

39. The edge protective packaging and distribution system of claim 37 wherein the wedge securing means includes the handle means coupled to each of the wedge shaped members for selectively removing wedge shaped members from contact with the roll of laminar stock.

40. The edge protective packaging and distribution system of claim 31 wherein the pallet covering means includes a selectively removable portion, proximate the wedge means, said selectively removable portion disengaging from the pallet covering means when the wedge means is removed from contact with the roll of laminar stock.

41. The edge protective packaging and distribution system of claim 38 wherein the pallet covering means includes a selectively removable portion, proximate the handle means, said selectively removable portion disengaging from the pallet covering means when the wedge means is removed from contact with the roll of laminar stock by the handle means.

42. The edge protective packaging and distribution system of claim 31 wherein substantially the entire pallet is covered either by the pallet covering means or the wedge means.

43. The edge protective packaging and distribution system of claim 42 wherein the pallet covering means covers the pallet except where the wedge means covers the pallet.

44. The edge protective packaging and distribution system of claim 31 wherein the roll of laminar stock is a roll of paper for use without a pin-feeding border.

45. The edge protective packaging and distribution system of claim 31 wherein the pallet covering means and wedge means are formed of corrugated cardboard to allow recycling of the protective cradle.

46. The edge protective packaging and distribution system of claim 31 wherein the wedge means is formed of a series of wedge shaped members, each of which is formed of a folded corrugated cardboard form.

47. The edge protective packaging and distribution system of claim 46 wherein the corrugated cardboard form for each of the wedge shaped members is a single sheet, die cut, recyclable member which is adapted to be folded into a stable, wedge shaped member without the need for additional connectors or adhesives.

48. A recyclable protective cradle for a roll of laminar stock rollingly oriented on a pallet, comprising:

pallet covering means on the pallet for covering at least a portion of the pallet, supporting and cushioning the roll of laminar stock; and wedge means, on the pallet covering means and contacting the roll of laminar stock proximate a portion of the pallet covering means supporting the roll of laminar stock, for preventing the roll of laminar stock from rolling, the wedge means also including handle means, coupled to the wedge means, for selectively removing the wedge means from contact with the roll of laminar stock;

the pallet covering means and the wedge means being formed of recyclable material.

49. The recyclable protective cradle of claim 48 wherein the wedge means includes at least one pair of wedge shaped members, each member of a pair of wedge shaped members being placed against the outer surface of the rolled laminar stock on an opposite side of the roll supporting portion of the pallet covering means than the other member of the pair of wedge shaped members so that the roll is trapped between the at least one pair of wedges.

50. The recyclable protective cradle of claim 49 wherein there are three pairs of wedge shaped members, each of which cradles one of three rolls of paper.

51. The recyclable protective cradle of claim 48 wherein the wedge means includes a first and a second wedge shaped member, the first wedge shaped member being placed against the outer surface of the roll of laminar stock on a first side of the roll supporting portion of the pallet covering means, and the second wedge shaped member is placed against the outer surface of the rolled laminar stock on a second side of the roll supporting portion of the pallet covering means, the first and second sides being on opposite sides of the roll supporting portion, so that the roll is trapped between the first and second wedge shaped members.

52. The recyclable protective cradle of claim 48 wherein the pallet covering means includes a selectively removable portion, proximate the wedge means, said selectively removable portion disengaging from the pallet covering means when the wedge means is removed from contact with the roll of laminar stock.

53. The recyclable protective cradle of claim 48 wherein the roll of laminar stock is a roll of paper for use without a pin-feeding border.

54. The recyclable protective cradle of claim 48 wherein the pallet covering means and wedge means are formed of corrugated cardboard to allow recycling of the protective cradle.

55. The recyclable protective cradle of claim 48 wherein the wedge means is formed of a series of wedge shaped members, each of which is formed of a folded corrugated cardboard form.

56. The recyclable protective cradle of claim 48 wherein the corrugated cardboard form for each of the wedge shaped members is a single sheet, die cut, recyclable member which is adapted to be folded into a stable, wedge shaped member without the need for additional connectors or adhesives.

57. An edge protective packaging and distribution system for a roll of laminar stock rollingly oriented on its outer surface on a pallet, comprising:

a cradle, resting on the pallet, for supporting and preventing rolling of the rolls on the pallet, said cradle including pallet covering means and wedge means, the pallet covering means being placed on the pallet for covering at least a portion of the pallet, supporting and cushioning the roll of laminar stock, and the wedge means, on the pallet covering means and contacting the roll of laminar stock proximate a portion of the pallet covering means supporting the roll of laminar stock, for preventing the roll of laminar stock from rolling, the wedge means also including handle means, coupled to the wedge means, for selectively removing the wedge means from contact with the roll of laminar stock;

strapping means coupled to the roll and the pallet for securing the roll on the cradle to the pallet.

58. The edge protective packaging and distribution system of claim 57 wherein the cradle is formed of recyclable material.

59. The edge protective packaging and distribution system of claim 57 wherein the wedge means includes at least one pair of wedge shaped members, each member of a pair of wedge shaped members being placed against the outer surface of the rolled laminar stock on an opposite side of the roll supporting portion of the pallet covering means than the other member of the pair of wedge shaped members so that the roll is trapped between the at least one pair of wedges.

60. The edge protective packaging and distribution system of claim 59 wherein there are three pairs of wedge shaped members, each of which cradles one of three rolls of paper.

61. The edge protective packaging and distribution system of claim 57 wherein the wedge means includes a first and a second wedge shaped member, the first wedge shaped member being placed against the outer surface of the roll of laminar stock on a first side of the roll supporting portion of the pallet covering means, and the second wedge shaped member is placed against the outer surface of the rolled laminar stock on a second side of the roll supporting portion of the pallet covering means, the first and second sides being on opposite sides of the roll supporting portion, so that the roll is trapped between the first and second wedge shaped members.

62. The edge protective packaging and distribution system of claim 57 wherein the pallet covering means further includes wedge securing means for engaging and coupling with the wedge means so that the wedge means is securely fastened to the pallet covering means.

63. The edge protective packaging and distribution system of claim 59 wherein the pallet covering means includes a selectively removable portion, proximate the wedge means, said selectively removable portion disengaging from the pallet covering means when the wedge means is removed from contact with the roll of laminar stock.

64. The edge protective packaging and distribution system of claim 57 wherein substantially the entire pallet is covered either by the pallet covering means or the wedge means.

65. The edge protective packaging and distribution system of claim 57 wherein the pallet covering means and wedge means are formed of corrugated cardboard to allow recycling of the protective cradle.

66. The edge protective packaging and distribution system of claim 57 wherein the wedge means is formed of a series of wedge shaped members, each of which is formed of a folded corrugated cardboard form.

67. The edge protective packaging and distribution system of claim 66 wherein the corrugated cardboard form for each of the wedge shaped members is a single sheet, die cut, recyclable member which is adapted to be folded into a stable, wedge shaped member without the need for additional connectors or adhesives.

*68. A protective cradle for a roll of laminar stock rollingly oriented on its outer surface on a pallet, comprising:*

*a pallet covering on the pallet which covers at least a portion of the pallet, supporting and cushioning the roll of laminar stock, said pallet covering including at least one opening therein;*

*a wedge, coupled to the pallet covering and contacting the roll of laminar stock proximate a portion of the pallet covering supporting the roll of laminar stock, for preventing the roll of laminar stock from rolling, said wedge being positioned in the at least one opening in the pallet covering; and*

*said wedge structurally associated with a handle for selectively removing at least a portion of the wedge from contact with the roll of laminar stock.*

*69. A protective cradle for a roll of laminar stock rollingly oriented on a pallet, comprising:*

*a pallet covering on the pallet which covers at least a portion of the pallet, supporting and cushioning the roll of laminar stock, said pallet covering including at least one opening therein;*

*a wedge coupled to the pallet covering and contacting the roll of laminar stock proximate a portion of the pallet covering supporting the roll of laminar stock, for preventing the roll of laminar stock from rolling, said wedge being positioned in the at least one opening in the pallet covering; and*

*a handle coupled to the wedge for selectively removing at least a portion of the wedge from contact with the roll of laminar stock.*

*70. An edge protective packaging and distribution system for a roll of laminar stock rollingly oriented on its outer surface on a pallet, comprising:*

*a cradle, resting on the pallet, for supporting and preventing rolling of the rolls on the pallet, said cradle including a pallet covering, a wedge and a handle proximate the wedge and, the pallet covering being placed on the pallet and covering at least a portion of the pallet, supporting and cushioning the roll of laminar stock, with said pallet covering including at least one opening therein, and the wedge being coupled to the pallet covering and contacting the roll of laminar stock proximate a portion of the pallet covering supporting the roll of laminar stock, for preventing the roll of laminar stock from rolling, said wedge being positioned within the at least one opening of the pallet covering, the handle enabling the selective removal of at least a portion of the wedge from contact with the roll of laminar stock; and*

*strapping coupled to the roll and the pallet for securing the roll on the cradle to the pallet.*

*71. A recyclable protective cradle for a roll of laminar stock rollingly oriented on a pallet, comprising:*

*a pallet covering on the pallet which covers at least a portion of the pallet, supporting and cushioning the roll of laminar stock, said pallet covering including at least one opening therein;*

*a wedge on the pallet covering and contacting the roll of laminar stock proximate a portion of the pallet cover-*

*ing supporting the roll of laminar stock, for preventing the roll of laminar stock from rolling, the wedge being positioned in the at least one opening in the pallet covering and being structurally associated with a handle, coupled to the wedge, for selectively removing the wedge from contact with the roll of laminar stock; and*

*the pallet covering and the wedge being formed of recyclable material.*

*72. A recyclable protective cradle for a roll of laminar stock rollingly oriented on a pallet, comprising:*

*a pallet covering on the pallet which covers at least a portion of the pallet, supporting and cushioning the roll of laminar stock; and*

*a wedge on the pallet covering and contacting the roll of laminar stock proximate a portion of the pallet covering supporting the roll of laminar stock, for preventing the roll of laminar stock from rolling, the wedge also including a handle, coupled to the wedge, for selectively removing the wedge from contact with the roll of laminar stock;*

*the pallet covering and the wedge being formed of recyclable material; and*

*a wedge engaging section for removably coupling said wedge on said pallet covering to hold said wedge on said pallet covering in contact with said roll of laminar stock and against movement away from said roll.*

*73. An edge protective packaging and distribution system for a roll of laminar stock rollingly oriented on its outer surface on a pallet, comprising:*

*a cradle, resting on the pallet, for supporting and preventing rolling of the roll of laminar stock on the pallet, said cradle including a pallet covering and a wedge, the pallet covering being placed on the pallet and covering at least a portion of the pallet, supporting and cushioning the roll of laminar stock, said pallet covering including at least one opening therein, and the wedge, on the pallet covering and contacting the roll of laminar stock proximate a portion of the pallet covering supporting the roll of laminar stock, for preventing the roll of laminar stock from rolling, the wedge being positioned in the at least one opening in the pallet covering and being structurally associated with a handle, for selectively removing the wedge from contact with the roll of laminar stock; and*

*strapping coupled to the roll and the pallet for securing the roll on the cradle to the pallet.*

*74. A protective cradle for a roll of laminar stock rollingly oriented on its outer surface on a pallet for rolling along a predetermined path from a storage position, said cradle including a roll supporting device for positioning on at least one side of said roll, said roll supporting device comprising:*

*a pallet covering on the pallet which covers at least a portion of the pallet, and having a roll supporting portion supporting and cushioning the roll of laminar stock in said storage position;*

*a wedge engaging section positioned and held at a location spaced from said roll and extending across at least a part of said path; and*

*a removable wedge coupled to said pallet covering and contacting the roll of laminar stock proximate a portion of the pallet covering supporting the roll of laminar stock, for preventing the roll of laminar stock from rolling, said removable wedge being in said path between said roll supporting portion and said wedge engaging section, with said wedge engaging section engaging said wedge to prevent movement of said wedge along said path in a direction away from said roll, said wedge contacting the roll supported on said roll supporting portion to prevent rolling of the roll along said path, from said storage position,*

*said wedge including a handle for selectively removing at least a portion of the wedge from contact with the roll of laminar stock.*

*75. The protective cradle of claim 74 wherein:*

*the wedge engaging section is connected to said pallet covering at a location on said path.*

*76. The protective cradle of claim 75 wherein:*

*said pallet covering includes an opening therein, said opening being located in said path immediately adjacent said roll and, at least in part, defining said wedge engaging section; and*

*said wedge is disposed, at least in part, within said opening in engagement with said wedge engaging section and supporting said roll against rolling along said path, from said storage position.*

*77. The protective cradle of claim 76 wherein:*

*said pallet covering includes an upper surface with a cut and foldable portion, folded to define said opening in said upper surface; and*

*said wedge engaging section is further defined, at least in part, by said foldable portion, folded to a position extending generally perpendicular to said upper surface of the pallet cover.*

*78. The protective cradle of claim 76 wherein:*

*said roll of laminar stock has a predetermined width;*

*said opening in said pallet covering extends through said covering to expose the pallet at a location along said path immediately adjacent said roll; and*

*said opening has a width, as measured across said path, which is less than said predetermined width of said roll to provide a portion of said covering on either side of said opening in alignment with said path.*

*79. The protective cradle according to any one of claims 74–78, wherein:*

*said roll supporting device is located along said predetermined path and on both sides of said roll to prevent rolling of the roll from said storage position in either direction along said path.*

*80. The protective cradle according to any one of claims 74–78 wherein:*

*said wedge engaging section has a first side facing said roll and a second side facing away from said roll;*

*said pallet covering has an outer edge on the second side of said wedge section; and*

*said pallet covering includes a tear-away section disposed along said path at a location on the second side of the wedge engaging section, said tear away section extending from said wedge engaging section to said outer edge of the pallet covering.*

*81. The protective cradle according to any one of claims 74–78, further comprising:*

*the handle connected to said wedge for selectively removing said wedge from contact with said roll.*

*82. A protective cradle for a roll of laminar stock rollingly oriented on its outer surface on a pallet for rolling along a predetermined path from a storage position, said cradle including a roll supporting device for positioning on at least one side of said roll, said roll supporting device comprising:*

*a pallet covering on the pallet which covers at least a portion of the pallet, and having a roll supporting*

*portion supporting and cushioning the roll of laminar stock in said storage position;*

*a wedge engaging section positioned and held at a location spaced from said roll and extending across at least a part of said path;*

*a removable wedge coupled to said pallet covering and contacting the roll of laminar stock proximate a portion of the pallet covering supporting the roll of laminar stock, for preventing the roll of laminar stock from rolling, said removable wedge being in said path between said roll supporting portion and said wedge engaging section, with said wedge engaging section engaging said wedge to prevent movement of said wedge along said path in a direction away from said roll, said wedge contacting the roll supported on said roll supporting portion to prevent rolling of the roll along said path, from said storage position; and*

*a handle coupled to the removable wedge for selectively removing at least a portion of the wedge from contact with the roll of laminar stock.*

*83. A protective cradle for a roll of laminar stock rollingly oriented on a pallet, comprising:*

*a pallet covering on the pallet which covers at least a portion of the pallet, supporting and cushioning the roll of laminar stock;*

*a wedge coupled to the pallet covering and contacting the roll of laminar stock proximate a portion of the pallet covering supporting the roll of laminar stock, for preventing the roll of laminar stock from rolling; and*

*a handle panel projecting away from the pallet covering and coupled to the wedge for selectively removing at least a portion of the wedge from contact with the roll of laminar stock.*

*84. A protective cradle for a roll of laminar stock rollingly oriented on a pallet, comprising:*

*a pallet covering on the pallet which covers at least a portion of the pallet, supporting and cushioning the roll of laminar stock;*

*a wedge coupled to the pallet covering and contacting the roll of laminar stock proximate a portion of the pallet covering supporting the roll of laminar stock, for preventing the roll of laminar stock from rolling; and*

*a handle connected to and extending from the pallet covering, said handle being structurally associated with the wedge for selectively removing at least a portion of the wedge from contact with the roll of laminar stock.*

*85. A protective cradle for a roll of laminar stock rollingly oriented on a pallet, comprising:*

*a pallet covering on the pallet which covers at least a portion of the pallet, supporting and cushioning the roll of laminar stock;*

*a wedge coupled to the pallet covering and contacting the roll of laminar stock proximate a portion of the pallet covering supporting the roll of laminar stock, for preventing the roll of laminar stock from rolling; and*

*a handle connected to the pallet covering and coupled to the wedge for selectively removing at least a portion of the wedge from contact with the roll of laminar stock, said handle being structurally associated with the pallet covering such that pulling on the handle tears a portion of the pallet covering and removes at least a portion of the wedge from contact with the roll of laminar stock.*

*86. A protective cradle for a roll of laminar stock rollingly oriented on a pallet, comprising:*

*a pallet covering on the pallet which covers at least a portion of the pallet, supporting and cushioning the roll of laminar stock;*

*a wedge coupled to the pallet covering and contacting the roll of laminar stock proximate a portion of the pallet covering supporting the roll of laminar stock, for preventing the roll of laminar stock from rolling; and*

*a handle coupled to the wedge for selectively removing at least a portion of the wedge from contact with the roll of laminar stock, said handle extending in a direction consisting of upwardly and outwardly from said wedge.*

*87. A protective cradle for a roll of laminar stock rollingly oriented on a pallet, comprising:*

*a pallet covering on the pallet which covers at least a portion of the pallet, supporting and cushioning the roll of laminar stock;*

*a wedge coupled to the pallet covering and contacting the roll of laminar stock proximate a portion of the pallet covering supporting the roll of laminar stock, for preventing the roll of laminar stock from rolling; and*

*a handle coupled to the wedge for selectively removing at least a portion of the wedge from contact with the roll of laminar stock, said handle connected to and extending upwardly and outwardly from said pallet covering.*

*88. A protective cradle for a roll of laminar stock rollingly oriented on a pallet, comprising:*

*a pallet covering on the pallet which covers at least a portion of the pallet, supporting and cushioning the roll of laminar stock;*

*a wedge coupled to the pallet covering and contacting the roll of laminar stock proximate a portion of the pallet covering supporting the roll of laminar stock, for preventing the roll of laminar stock from rolling; and*

*a handle coupled to the wedge for selectively removing at least a portion of the wedge from contact with the roll of laminar stock, said handle having a handle opening, with said handle opening being spaced from the wedge.*

* * * * *